United States Patent
Olmstead et al.

(10) Patent No.: US 8,118,226 B2
(45) Date of Patent: Feb. 21, 2012

(54) HIGH-RESOLUTION OPTICAL CODE IMAGING USING A COLOR IMAGER

(75) Inventors: Bryan L. Olmstead, Eugene, OR (US); Alan Shearin, Eugene, OR (US)

(73) Assignee: Datalogic Scanning, Inc., Eugene, OR (US)

( * ) Notice: Subject to any disclaimer, the term of this patent is extended or adjusted under 35 U.S.C. 154(b) by 122 days.

(21) Appl. No.: 12/704,313

(22) Filed: Feb. 11, 2010

(65) Prior Publication Data
US 2010/0200658 A1    Aug. 12, 2010

Related U.S. Application Data

(60) Provisional application No. 61/151,768, filed on Feb. 11, 2009.

(51) Int. Cl.
*G06K 7/08*    (2006.01)
(52) U.S. Cl. .............. 235/455; 235/462.01; 235/462.09; 235/462.21; 235/470
(58) Field of Classification Search .................. 235/455, 235/462.01, 462.09, 462.21, 462.42, 470
See application file for complete search history.

(56) References Cited

U.S. PATENT DOCUMENTS

| | | | |
|---|---|---|---|
| 3,971,065 A | 7/1976 | Bayer | |
| 5,714,745 A | 2/1998 | Ju et al. | |
| 5,786,582 A * | 7/1998 | Roustaei et al. | 235/462.07 |
| 5,804,805 A | 9/1998 | Koenck et al. | |
| 6,628,330 B1 | 9/2003 | Lin | |
| 6,642,962 B1 | 11/2003 | Lin et al. | |
| 6,722,569 B2 | 4/2004 | Ehrhart et al. | |
| 6,765,703 B1 | 7/2004 | Watanabe | |
| 6,832,729 B1 | 12/2004 | Perry et al. | |
| 6,889,904 B2 | 5/2005 | Bianculli et al. | |
| 6,976,629 B2 | 12/2005 | Carlson | |
| 6,976,631 B2 | 12/2005 | Kashi et al. | |
| 7,014,114 B2 | 3/2006 | Maiman | |
| 7,071,978 B2 | 7/2006 | Hunter et al. | |
| 7,163,149 B2 | 1/2007 | He et al. | |

(Continued)

FOREIGN PATENT DOCUMENTS
JP    06-309486    4/1994

OTHER PUBLICATIONS

International Search Report & Written Opinion, International Application No. PCT/US2010/023918.

(Continued)

*Primary Examiner* — Allyson Trail
(74) *Attorney, Agent, or Firm* — Stoel Rives LLP

(57) ABSTRACT

An optical code or other data reading device includes a color image sensor array positioned to sense light reflected from an object, and to produce image data. In one configuration, the color image sensor array has multiple sets (e.g., first and second sets) of sensor elements that are sensitive to corresponding visible wavelength bands of light (e.g., first and second wavelength bands), the sets also being sensitive to light within an infrared wavelength band. An artificial illumination source is positioned to illuminate the field of view with light that is reflected off an object in the field of view toward the image sensor array, the illumination source being operable to produce infrared light having wavelengths within the infrared wavelength band so that, upon illumination, at least some sensor elements of each of the sets are sensitive to the infrared light and contribute to production of the image data.

20 Claims, 3 Drawing Sheets

U.S. PATENT DOCUMENTS

| | | | |
|---|---|---|---|
| 7,224,540 B2 | 5/2007 | Olmstead et al. | |
| 7,387,252 B2 | 6/2008 | Gannon et al. | |
| 7,594,609 B2* | 9/2009 | Kotlarsky et al. | 235/462.42 |
| 7,626,769 B2* | 12/2009 | Olmstead et al. | 359/721 |
| 7,695,608 B2* | 4/2010 | Kim et al. | 205/775 |
| 2005/0011956 A1* | 1/2005 | Carlson | 235/462.42 |
| 2005/0056699 A1 | 3/2005 | Meier et al. | |
| 2006/0060653 A1 | 3/2006 | Wittenberg et al. | |
| 2006/0208083 A1 | 9/2006 | Kotlarsky et al. | |
| 2006/0274171 A1 | 12/2006 | Wang | |
| 2008/0107354 A1 | 5/2008 | Dowski et al. | |
| 2008/0169347 A1 | 7/2008 | Olmstead | |
| 2009/0159685 A1* | 6/2009 | Shi et al. | 235/462.42 |
| 2010/0213259 A1 | 8/2010 | Gao | |

OTHER PUBLICATIONS

Frédéric et al., Advances in Camera Phone Picture Quality, Photonics Spectra, Nov. 2007, 2 pp.

Tisse et al., Extended depth-of-field (EDoF) Using Sharpness Transport Across Colour Channels, Proceedings of Electronic Imaging vol. 7250, Jan. 19, 2009, 11 pp.

* cited by examiner

HIGH-RESOLUTION OPTICAL CODE IMAGING USING A COLOR IMAGER

RELATED APPLICATION

This application claims benefit under 35 U.S.C. §119(e) of U.S. Provisional Application No. 61/151,768, titled "High-Resolution Optical Code Imaging Using a Color Imager," filed Feb. 11, 2009, the entire contents of which is incorporated herein by reference.

TECHNICAL FIELD

The field of this disclosure relates generally to systems and methods of data reading, and more particularly but not exclusively to reading of optical codes (e.g., bar codes).

BACKGROUND INFORMATION

Optical codes encode useful, optically-readable information about the items to which they are attached or otherwise associated. Perhaps the most common example of an optical code is the bar code. Bar codes are ubiquitously found on or associated with objects of various types, such as the packaging of retail, wholesale, and inventory goods; retail product presentation fixtures (e.g., shelves); goods undergoing manufacturing; personal or company assets; and documents. By encoding information, a bar code typically serves as an identifier of an object, whether the identification be to a class of objects (e.g., containers of milk) or a unique item. A typical linear or one-dimensional bar code, such as a UPC code, consist of alternating bars (i.e., relatively dark areas) and spaces (i.e., relatively light areas). The pattern of alternating bars and spaces and the widths of those bars and spaces represent a string of binary ones and zeros, wherein the width of any particular bar or space is an integer multiple of a specified minimum width, which is called a "module" or "unit." Thus, to decode the information, a bar code reader must be able to reliably discern the pattern of bars and spaces, such as by determining the locations of edges demarking adjacent bars and spaces from one another, across the entire length of the bar code.

Bar codes are just one example of the many types of optical codes in use today. Higher-dimensional optical codes, such as, two-dimensional matrix codes (e.g., MaxiCode) or stacked codes (e.g., PDF 417), which are also sometimes referred to as "bar codes," are also used for various purposes.

Different methods and types of optical code reading devices are available for capturing an optical code and for decoding the information represented by the optical code. For example, image-based readers are available that include imagers, such as charge coupled devices (CODs) or complementary metal oxide semiconductor (CMOS) imagers, that generate electronic image data that represent an image of a captured optical code. Image-based readers are used for reading one-dimensional optical codes and higher-dimensional optical codes. Because optical codes most often include dark and light patterns (e.g., black and white) that represent binary data, imagers of image-based readers are typically monochrome so that uniform sensitivity for each pixel of the imager is achieved. Also, typical image-based readers include light sources that illuminate the image-based reader's field of view with narrowband visible light to achieve high optical resolution by avoiding chromatic aberration and polychromatic diffraction effects. Narrowband light sources typically used for imaging include laser diodes, having a bandwidth on the order of 5 nanometers (nm), and light emitting diodes (LEDs), having a bandwidth on the order of 50 nm.

Common imagers made for image capturing devices, such as still cameras and video cameras, however, are color imagers—not monochrome. Because imagers made for many image capturing devices are color, color imagers are generally made in higher volume and have become less expensive than monochrome imagers. Some image-based readers have included color imagers, but the present inventors have recognized that those readers do not effectively achieve high optical resolution comparable to monochrome image-based readers with the same number and size of pixels.

SUMMARY OF THE DISCLOSURE

This disclosure describes improved optical reading devices and associated methods.

One embodiment is directed to an optical code reading device that includes a color image sensor array positioned to sense light reflected from an object in a field of view of the optical code reading device and to produce from the sensed reflected light image data representing an image of the object. The color image sensor array has a first set of sensor elements that are sensitive to a first visible wavelength band of light, and a second set of sensor elements that are sensitive to a second visible wavelength band of light. The first and second sets of sensor elements are also sensitive to light within an infrared wavelength band. The optical code reading device includes an artificial illumination source positioned to illuminate the field of view of the optical code reading device with light that is incident upon and reflected from the object in the field of view toward the image sensor array. The illumination source is operable to produce infrared light having wavelengths within the infrared wavelength band so that, upon illumination of the field of view, at least some sensor elements of each of the first and second sets are sensitive to the infrared light and contribute to production of the image data.

Additional aspects and advantages will be apparent from the following detailed description of preferred embodiments, which proceeds with reference to the accompanying drawings.

DETAILED DESCRIPTION OF PREFERRED EMBODIMENTS

With reference to the above-listed drawings, this section describes particular embodiments and their detailed construction and operation.

Figure 1:
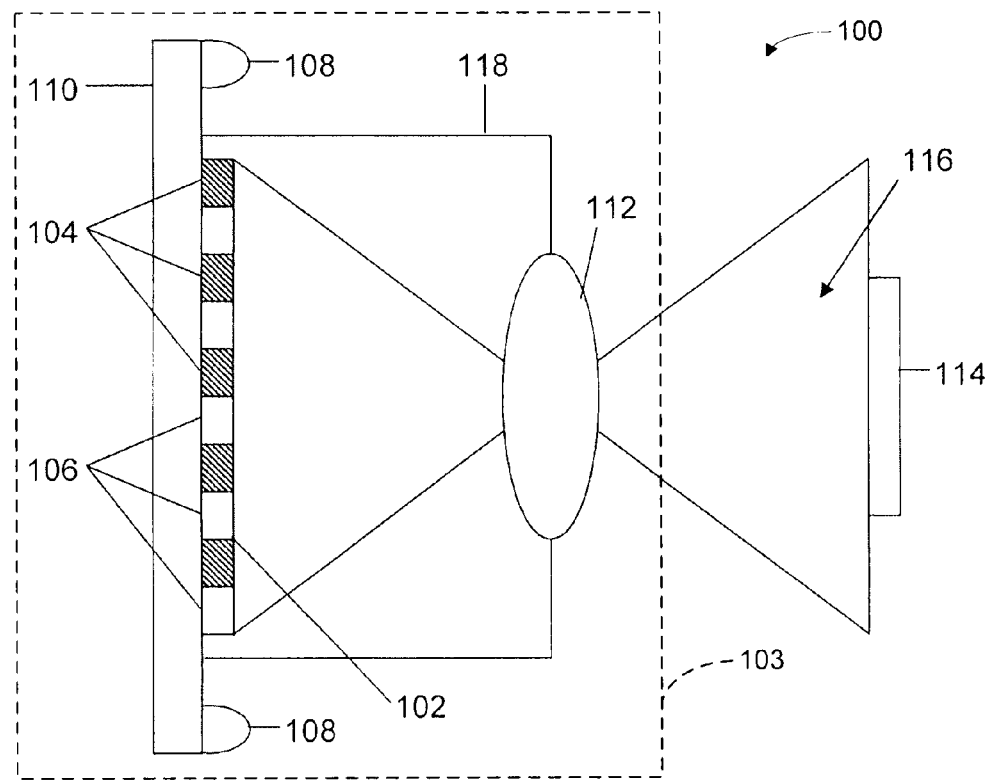
FIG. 1 is a diagram of an imaging system according to a preferred embodiment.

FIG. 1 is a diagram of an imaging device 100, such as an optical code reading device, according to one embodiment. The imaging device 100 includes a color image sensor array 102 contained within a housing 103 of the imaging device 100. The color image sensor array 102 includes a first set of sensor elements 104 and a second set of sensor elements 106. The sensor elements of the color image sensor array 102 may be arranged in a one-dimensional array or, preferably, a two-dimensional array. The color image sensor array 102 may be a CCD, such as a frame-transfer or interline-transfer CCD. The color image sensor array 102 may alternatively be a CMOS imager, such as a global shuttered or rolling-reset CMOS imager. Suitable imagers or image sensor arrays are available, for example, from Aptina Imaging Corporation of San Jose, Calif., USA including, but not limited to, a model MT9V022 VGA color imager. Imagers are available from many manufacturers and are available in various resolutions (numbers of pixels). For higher resolution applications, other imagers from Aptina Imaging Corporation are suitable, including the model MT9M001 with 1.3 megapixels, the model MT9M002 with 1.6 megapixels, and the model MT9P001 with 5 megapixels. As imaging technology advances, imager resolution increases and other imagers may also be suitable.

Figure 2:
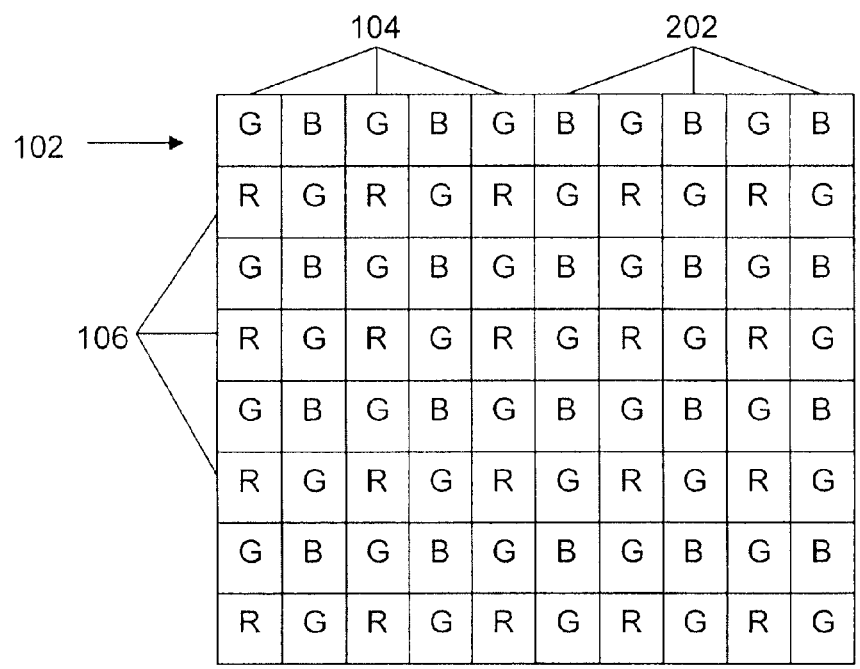
FIG. 2 is a diagram of a color filter pattern of a color image sensor array of the imaging system of FIG. 1.

The color image sensor array 102 may include more than two sets of sensor elements. For example, the color image sensor array 102 may include three sets of sensor elements 104, 106, and 202 arranged in a Bayer pattern as shown in FIG. 2. Each set of sensor elements corresponds to a different color. For example, the first set 104 may be sensitive to light having wavelengths that correspond to the color green (G) (wavelengths ranging between about 500 nanometers (nm) and about 600 nm), the second set 106 may be sensitive to light having wavelengths that correspond to the color red (R) (wavelengths ranging between about 600 nm and about 750 nm), and the third set 202 may be sensitive to light having wavelengths that correspond to the color blue (B) (wavelengths ranging between about 400 nm and about 500 nm). Moreover, a color filter associated with each sensor element of the different sets appreciably filters out visible light that does not correspond to its color (i.e., the color filters associated with the first set 104 appreciably block out red and blue light).

Figure 3:
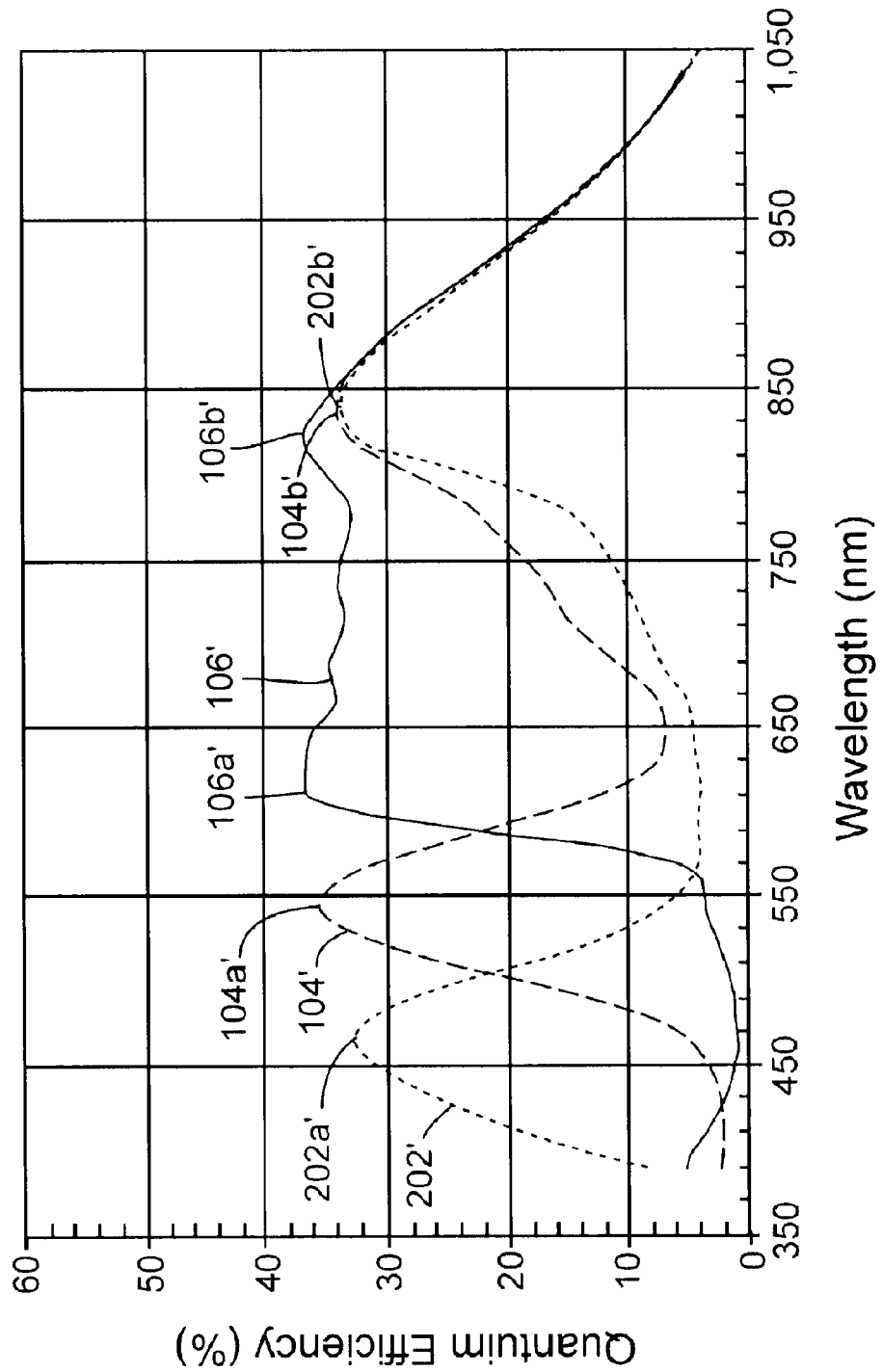
FIG. 3 is a graph of the sensitivity of blue, green, and red sensor elements as a function of light wavelength of an illustrative color image sensor array used in the imaging system of FIG. 1.

FIG. 3 is a graph depicting an example of the quantum efficiency percentage versus the wavelength of light incident upon red, green and blue sensor elements of the model MT9V022 VGA color imager available from Aptina Imaging Corporation that may be used as the color image sensor array 102. A curve 104', corresponding to the spectral sensitivity of the sensor elements of the first set 104, has a local peak 104a' at a wavelength corresponding to the color green. A curve 106', corresponding to the spectral sensitivity of the sensor elements of the second set 106, has a local peak 106a' at a wavelength corresponding to the color red. A curve 202', corresponding to the spectral sensitivity of the sensor elements of the third set 202, has a local peak 202a' at a wavelength corresponding to the color blue. The curves 104', 106', and 202' also have respective local peaks 104b', 106b', and 202b' near a common wavelength that corresponds non-visible light—in this case infrared light. In other words, the first set 104, the second set 106, and the third set 202 are not only sensitive to green, red, and blue light, respectively, but also to light within an infrared wavelength band. The infrared wavelength band, to which the first set 104, the second set 106, and the third set 202 are sensitive, may be relatively narrow (e.g., no more than about 100 nm) and may include 850 nm. Also, the quantum efficiency percentage associated with the local peaks 104b', 106b', and 202b' may be substantially the same or within a narrow percentage range. In other words, the sensitivity of the sets 104, 106, and 202 to infrared light may be substantially equal or within a narrow sensitivity range (e.g., about five percent in quantum efficiency) so that an average intensity value of light sensed by the first set 104 may be substantially equal to an average intensity value of light sensed by the second set 106 and an average intensity value of light sensed by the third set 202.

The color image sensor array 102 need not be limited to three sets of sensor elements or the colors red, green, and blue, and the color image sensor array 102 may include color filter patterns other than the Bayer pattern. For example, the color image sensor array 102 may include a cyan, yellow, green, and magenta (CYGM) filter or a red, green, blue, and emerald (RGBE) filter in which the sensor elements of the different colors are also sensitive to light within an infrared wavelength band. The color filter pattern used on the color filter array 102 may be chosen to achieve accurate color rendition or to improve sensitivity in a color photograph application. While these distinctions are not necessary in the present embodiment, the imaging device 100 and its associated methods are flexible to compensate for the effects of these various filters.

The imaging device 100 may also include one or more artificial illumination sources 108 (two illumination sources are depicted in FIG. 1). The artificial illumination sources 108 may be mounted to a printed circuit board 110 upon which the color image sensor array 102 is also mounted. In a first embodiment, the artificial illumination sources 108 are operable to emit infrared illumination. The infrared illumination emitted by the artificial illumination sources 108 may be narrowband infrared illumination (e.g., illumination having a bandwidth less than about 100 nm). Also, the wavelength bandwidth of light emitted by the artificial illumination sources 108 preferably includes 850 nm, when using a color image sensor array with characteristics shown in FIG. 3.

The imaging device 100 typically includes a suitable optical system 112 positioned to focus light upon the color image sensor array 102. The optical system 112 may include conventional optical components, such as one or more lenses, an aperture, and, in some cases, a mechanical shutter. As an alternative to a mechanical shutter, the color image sensor array 102 may include electronic shuttering means. The optical system 112 may also include one or more optical filters to block out certain wavelengths of light. In one example, when infrared illumination sources are selected for the artificial illumination sources 108, the optical system 112 excludes an infrared filter, which is operable to block out infrared light, and may include one or more optical filters that are operable to block out light that does not have wavelengths within the infrared wavelength band. Although the artificial illumination sources 108 are shown as being mounted on the printed circuit board 110, the artificial illumination sources 108 may be positioned in other convenient locations to provide illumination of the object 114.

Figure 4:
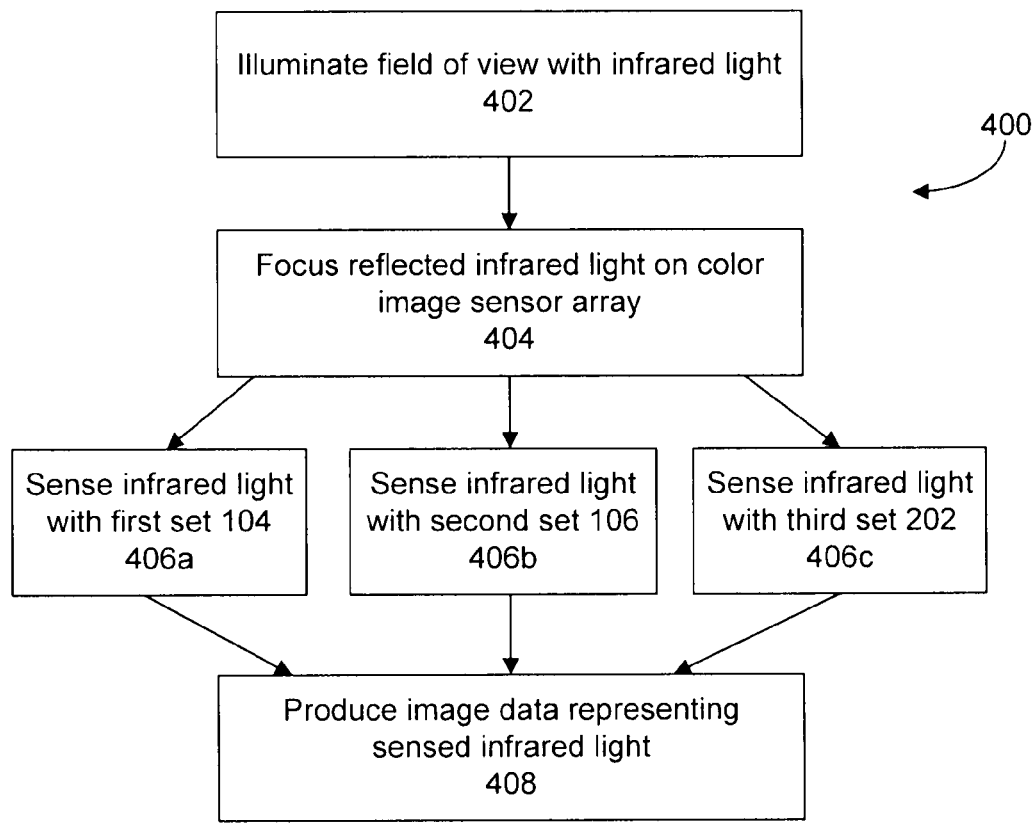
FIG. 4 is a flowchart showing the operational steps of the imaging system of FIG. 1.

A preferred operation of the imaging device 100 will now be described with reference to a flowchart 400 of FIG. 4. The artificial illumination sources 108 illuminate the field of view 116 with infrared illumination (step 402) or illumination of another non-visible frequency at which all of the sensor elements have an acceptable response. If an object 114 (e.g., an optical code) is within the field of view 116 of the imaging device, infrared light reflects off the object 114 toward the optical system 112. Infrared light that is incident on the optical system 112 is focused by the optical system 112 onto the sensor elements of the color image sensor array 102 (step 404). Sensor elements of the first set 104, the second set 106, and the third set 202 sense the focused infrared light (steps 406a, 406b, and 406c). The color image sensor array 102 produces image data based upon the infrared light that is incident on, and sensed by, the sensor elements of the first, second, and third sets 104, 106, and 202 (step 408). An enclosure 118 may cover the color image sensor array 102 except where the optical system 112 is located, so that an appreciable amount of light from sources other than the artificial illumination sources 108 does not reach the color image sensor array 102. Because each of the sets 104, 106, and 202 are sensitive to infrared light, each of the sets 104, 106, and 202 contribute to production of the image data and high-resolution infrared imaging of the object 114 may be achieved. Each of the sets 104, 106, and 202 may contribute to the production of the image data to a sufficiently equal extent that no one of the set 104, 106, or 202 contributes to the image data appreciably more than the other two sets. The resolution of an infrared image represented by the image data may be substantially equal to a resolution produced by a monochrome image sensor array having the same size of sensor elements and the same number of sensor elements as the sum of the number of sensor elements in the sets 104, 106, and 202. In other words, when illuminated with infrared light, the color image sensor array 102 may achieve a resolution substantially equivalent to a monochrome imager.

In a second alternative embodiment, the artificial illumination sources 108 emit visible light having red, green, and blue light components. For example, the artificial illumination sources 108 emit visible polychromatic (white) light, or a combination of monochromatic or quasi-monochromatic lights having wavelengths corresponding to the colors red, green and blue. In one configuration, the artificial illumination sources 108 include a red light, a green light and a blue light (e.g., red, green and blue light emitting diodes). Light emission intensities of each of the red, green and blue light components are calibrated to compensate for the behavior of the color image sensor array 102 described below. In a conventional optical code reading device that includes a monochrome imager, data representing an image captured by the monochrome imager are converted to grayscale where the shade of gray produced by a sensor element of the monochrome imager depends upon the light intensity level captured by it. For the color image sensor array 102, the patterned color filter that covers the array of sensor elements effects the transmittance of light, and, thus, the intensity of light that is incident on the sensor elements of the sets 104, 106, and 202. Also, the transmittance of light associated with the filter portions may be different between colors such that the filter portions of one color may transmit more (or less) light than the filter portions of the other colors. Moreover, the sensor elements behind the filter portions may be inherently more or less sensitive to certain wavelengths of light (e.g., the sensor elements may be more sensitive to red wavelengths than to blue and green wavelengths). The effects of the color dependent differences in light transmittances and pixel sensitivities can be seen in the example of FIG. 3 in which the quantum efficiencies associated with the local peaks 104a', 106a' and 202a' are different from one another.

Figure 5:
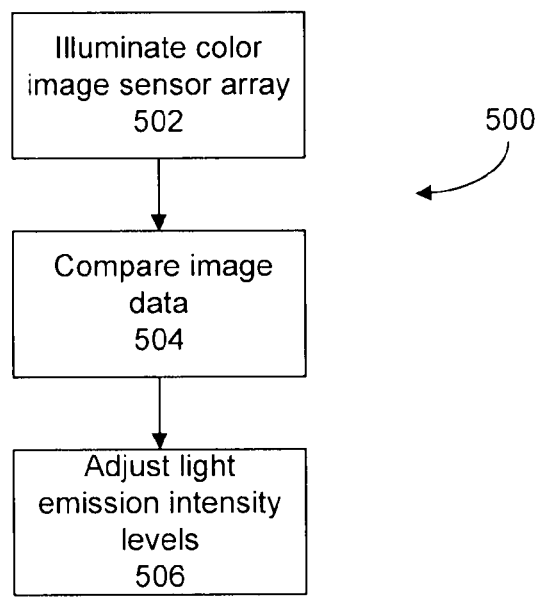
FIG. 5 is a flowchart of an illumination calibration method according to one embodiment.

Prior to operation, the differences in the quantum efficiencies of the sets 104, 106 and 202 may be determined and the light sources 108 may be calibrated according to an illumination calibration method 500 shown in the flowchart of FIG. 5. First, the color image sensor array 102 is uniformly illuminated with a light source, such as the sources 108 or another light source (step 502). In one example, the color image sensor array 102 is directly illuminated with the light source. In another example, a white background (such as a white piece of paper) is illuminated, and an image of the white background is captured by the color image sensor array 102. Each of the sets 104, 106 and 202 produce a set of image data representing light intensity levels captured by the sensor elements. The light intensity levels represented in the sets of image data are compared to determine the relative sensitivity of each of the sets 104, 106 and 202 (step 504). In one example, an average intensity level for each of the sets 104, 106 and 202 is computed from the sets of image data and the averages are compared to determine the relative differences in quantum efficiencies between the sets 104, 106 and 202.

After the image data are analyzed, the light emission intensity levels of the red, green and blue light components of the artificial illumination sources 108 are adjusted to compensate for the sensitivity differences between the sets 104, 106 and 202 (step 506). For example, if the quantum efficiency of the second set 106 is greater than the quantum efficiency of the first set 104, the intensity level of the green component emitted by the artificial illumination sources 108 is selected to be greater than the intensity level of the red component by an amount proportional to the difference between the quantum efficiencies of the first and second sets 104 and 106. In one example, the intensity levels of the red, green and blue light components are selected so that the average intensity levels of light captured by the sets 104, 106 and 202 are substantially the same. Adjustment of the light emission intensity levels can be implemented by varying an amount of current supplied to the red, green, and blue lights of the artificial illumination sources 108. Alternatively, the color image sensor array may include an analog or digital gain for each of the sets 104, 106 and 202, which are adjusted instead of the light emission intensity levels of the artificial illumination sources 108 to provide a uniform image output. This alternative embodiment may allow the artificial illumination sources 108 to provide a more pleasing color of illumination, such as white.

In operation, the calibrated red, green and blue light components illuminate the object 114, the sensor elements of the sets 104, 106 and 202 capture an image of the object 114 and produced image data, and the image data are converted to grayscale. Similar to the first embodiment, high-resolution imaging may be realized because each of the sets 104, 106, and 202 contributes to the production of the image data.

In a third alternative embodiment, the optical system 112 includes a dispersive (intentionally uncorrected chromatic aberration) lens assembly. For example, U.S. Pat. No. 7,224,540 ("the '540 patent"), the entire contents of which are incorporated herein by reference, describes a dispersive lens assembly. Artificial illumination sources 108 emit white light or multiple quasi-monochromatic lights that includes red, green, and blue light. As discussed in the '540 patent, because of the lens assembly's chromatic aberration, a wavelength dependent focal shift (i.e., longitudinal aberration) of the reflected light occurs. The data from each of the sets 104, 106, and 202 of the color image sensor array 102 are processed as separate color sub-images, called color planes (such as red, green, and blue color planes). The depth of field of each color plane is distinct and typically overlapping. The focus quality of each color plane depends on the distance between the object 114 and the imaging device 100. For example, if the distance between the object 114 and the imaging device 100 provides the best green focus, the green color plane of the first set 104 will be well focused while the red and blue color planes of the second set 106 and the third set 202 will be blurred. Thus, by comparing the color planes of the first, second, and third sets 104, 106, and 202, distance between the object 114 and the imaging device 100 can be estimated by determining which color plane is in best focus.

One of several different methods may be used for comparing the sharpness of the color planes. For example, techniques used in passive auto-focusing systems may be used. As additional examples, the amount of high spatial frequency content of the color planes may be measured (such as by computing a Fourier transform), or edge sharpness for the color planes may be measured (i.e., measuring the intensity difference between neighboring pixels). By knowing which color plane is in best focus, and by knowing the depth of field associated with the best focused color plane, distance between the object 114 and the imaging device 100 may be estimated. Distance estimation using an optical code reading device may be useful in a number of applications. For example, estimating distance may be used for measuring the dimensions of an optical code to ascertain whether the optical code is of acceptable size (i.e., whether the optical code was printed properly). The third embodiment also provides an increased overall depth of field for the imaging device 100 because the first, second, and third sets 104, 106, and 202 form focused images at different distances, although the resolution of the image from each color plane is lower in the case of infrared illumination, since only one pixel set is capturing a well focused image.

As skilled persons will appreciate in light of this disclosure, certain embodiments may be capable of achieving certain advantages, including (1) enabling utilization of lower cost color imagers in optical code reading devices; (2) achieving higher image resolution by utilizing all of an image sensor's pixels to contribute to an image; (3) avoidance of visible illumination from the illumination source, which can be discernable and annoying to human observers; (4) extending the depth of field of an optical code reader or measuring distance to an object using a chromatically aberrated lens, and (5) compensation for manufacturing variation in the sensitivity of different colored pixels. Other advantages of various embodiments will be apparent upon reading the above sections. Combinations of the above embodiments, and other embodiments not specifically described herein will be apparent to skilled persons upon reviewing the above description.

Though the present invention has been set forth in the form of its preferred embodiments, it is nevertheless intended that modifications to the disclosed systems and methods may be made without departing from inventive concepts set forth herein.

The invention claimed is:

1. A method of imaging an object in a field of view of an optical code reading device, the optical code reading device having a color image sensor array, the method comprising:
    illuminating the field of view of the optical code reading device with artificial infrared light that is incident upon the object, thereby producing reflected infrared light, the reflected infrared light having wavelengths within an infrared wavelength band;
    sensing the reflected infrared light with a first set of sensor elements of the color image sensor array, the first set of sensor elements being sensitive to the infrared light and to visible light having wavelengths within a first visible wavelength band;
    sensing the reflected infrared light with a second set of sensor elements of the color image sensor array, the second set of sensor elements being sensitive to the infrared light and to visible light having wavelengths within a second visible wavelength band different from the first visible wavelength band; and
    producing image data from the first and second sets of sensor elements, the image data being derived from the infrared light sensed by the first and second sets of sensor elements and representing a high-resolution infrared image of the object.

2. A method according to claim 1, further comprising:
    sensing the reflected infrared light with a third set of sensor elements of the color image sensor array, the third set of sensor elements being sensitive to the infrared light and to visible light having wavelengths within a third visible wavelength band different from each of the first and second visible wavelength bands; and
    producing the image data from the first, second and third sets of sensor elements, the image data being derived from the infrared light sensed by the first, second and third sets of sensor elements.

3. A method according to claim 2, wherein the resolution of the infrared image represented by the image data is substantially equal to a resolution produced by a monochrome image sensor array having the same number of sensor elements as the sum of the numbers of sensor elements in the first, second and third sets of sensor elements.

4. A method according to claim 2, wherein the first, second and third visible wavelength bands correspond to the colors red, green and blue.

5. A method according to claim 1, wherein the infrared wavelength band includes 850 nm.

6. A method according to claim 1, wherein upon illumination of the field of view, sensor elements of each of the first and second sets of sensor elements are sensitive to the infrared light to a sufficiently equal extent such that an average intensity value of light sensed by the first set of sensor elements is substantially equal to an average intensity value of light sensed by the second set of sensor elements.

7. A method according to claim 1, further comprising:
    intermittently blocking the reflected infrared light from reaching the sensor elements of the first and second sets by a mechanical shutter.

8. An optical code reading device comprising:
    a color image sensor array positioned to sense light reflected from an object in a field of view of the optical code reading device and to produce from the sensed reflected light image data representing an infrared image of the object, the color image sensor array comprising:
        a first set of sensor elements that are sensitive to a first visible wavelength band of light, and
        a second set of sensor elements that are sensitive to a second visible wavelength band of light, wherein the first and second sets of sensor elements are sensitive to light within an infrared wavelength band; and
    an artificial illumination source positioned to illuminate the field of view of the optical code reading device with light that is incident upon and reflected from the object in the field of view toward the color image sensor array, the artificial illumination source being operable to produce infrared light having a wavelength within the infrared wavelength band so that, upon illumination of the field of view, at least some sensor elements of each of the first and second sets are sensitive to the infrared light and contribute to production of the image data.

9. An optical code reading device according to claim 8, wherein the color image sensor array includes a third set of sensor elements that are sensitive to a third visible wavelength band of light and to light within the infrared wavelength band.

10. An optical code reading device according to claim 9, wherein the first, second and third visible wavelength bands correspond to the colors red, green and blue.

11. An optical code reading device according to claim 8, wherein the infrared wavelength band includes 850 nm.

12. An optical code reading device according to claim 8, wherein upon illumination of the field of view, sensor elements of each of the first and second sets of sensor elements are sensitive to the infrared light to a sufficiently equal extent such that an average intensity value of light sensed by the first set of sensor elements is substantially equal to an average intensity value of light sensed by the second set of sensor elements.

13. An optical code reading device according to claim 8, wherein the color image sensor array is part of a rolling-reset CMOS imager.

14. An optical code reading device according to claim 8, further comprising:
a mechanical shutter positioned between the color image sensor array and the field of view.

15. An optical code reading device comprising:
a color image sensor array positioned to sense light reflected from an object in a field of view of the optical code reading device and to produce from the sensed reflected light image data representing an image of the object, the color image sensor array having a first set, a second set, and a third set of sensor elements, wherein:
the first set of sensor elements are characterized by a first spectral sensitivity that varies as a first function of wavelength, the first function having a local peak at a first peak sensitivity wavelength and also having a local peak near a first non-visible wavelength;
the second set of sensor elements are characterized by a second spectral sensitivity that varies as a second function of wavelength, the second function having a local peak at a second peak sensitivity wavelength and also having a local peak near the first non-visible wavelength;
the third set of sensor elements are characterized by a third spectral sensitivity that varies as a third function of wavelength, the third function having a local peak at a third peak sensitivity wavelength and also having a local peak near the first non-visible wavelength; and
the first, second and third peak sensitivity wavelengths being different wavelengths; and
an artificial illumination source positioned to illuminate the field of view of the optical code reading device with light that is incident upon and reflected from the object in the field of view toward the image sensor array, the illumination source being operable to produce radiation including light having the first non-visible wavelength.

16. An optical code reading device according to claim 15, wherein the first non-visible wavelength is an infrared wavelength.

17. A method of calibrating light emission of an optical code reading device, the optical code reading device including a color image sensor array and an artificial illumination source, the color image sensor array including a first set of sensor elements that are sensitive to a first visible wavelength band of light and a second set of sensor elements that are sensitive to a second visible wavelength band of light different than the first visible wavelength band of light, the artificial illumination source operable to emit visible light having a first light component corresponding to a wavelength in the first visible wavelength band of light and a second light component corresponding to a wavelength in the second visible wavelength band of light, comprising:
illuminating the color image sensor array with visible light having the first light component and the second light component;
sensing the first light component with the first set of sensor elements, the first set of sensor elements characterized by a first quantum efficiency;
sensing the second light component with the second set of sensor elements, the second set of sensor elements characterized by a second quantum efficiency that is less than the first quantum efficiency;
producing a first set of image data representing light intensities sensed by the first set of sensor elements and a second set of image data representing light intensities sensed by the second set of sensor elements;
determining a difference between the first and second quantum efficiencies by comparing the first and second sets of image data; and
selecting for the artificial illumination source a first light emission intensity level corresponding to the first light component and a second light emission intensity level corresponding to the second light component, the second light emission intensity level being different than the first light emission intensity level by an amount proportional to the difference between the first and second quantum efficiencies of the first and second sets of sensor elements.

18. The method of claim 17, further comprising selecting the first and second light emission intensity levels of the first and second light components so that, upon illumination, an average intensity of light sensed by the first set of sensor elements is substantially the same as an average intensity level of light sensed by the second set of sensor elements.

19. The method of claim 17, wherein the illuminating step further comprises illuminating with the artificial illumination source an object in a field of view of the optical code reading device, the visible light reflecting off the object toward the color image sensor array to thereby illuminate the color image sensor array.

20. An optical code reading device comprising:
a color image sensor array positioned to sense light reflected from an object in a field of view of the optical code reading device, the color image sensor array comprising:
a first set of sensor elements that are sensitive to a first visible wavelength band of light, the first set of sensor elements characterized by a first quantum efficiency; and
a second set of sensor elements that are sensitive to a second visible wavelength band of light, the second set of sensor elements characterized by a second quantum efficiency, the first and second quantum efficiencies having a difference therebetween in which the second quantum efficiency is less than the first quantum efficiency; and
an artificial illumination source positioned to illuminate the field of view of the optical code reading device with light that is incident on and reflected from the object in the field of view toward the color image sensor array, the artificial illumination source being operable to produce light including:
a first light component having a first light emission intensity level and a wavelength in the first visible wavelength band of light, and
a second light component having a second light emission intensity level and a wavelength in the second visible wavelength band of light, wherein the second light emission intensity level is different than the first light emission intensity level of the first light component by an amount that is proportional to the difference between the first and second quantum efficiencies.

* * * * *